United States Patent [19]

Yamada et al.

[11] Patent Number: 5,038,709
[45] Date of Patent: Aug. 13, 1991

[54] GRANULATING AND COATING APPARATUS

[75] Inventors: Shuri Yamada, Kawagoe; Kei Takebayashi, Tokyo; Narimichi Takei, Sugito; Nagahiko Tanaka, Sakado, all of Japan

[73] Assignee: Freund Industrial Co., Ltd., Tokyo, Japan

[21] Appl. No.: 396,439

[22] Filed: Aug. 21, 1989

[30] Foreign Application Priority Data

| Aug. 22, 1988 | [JP] | Japan | 63-209146 |
| Aug. 22, 1988 | [JP] | Japan | 63-209147 |
| Aug. 22, 1988 | [JP] | Japan | 63-209148 |
| Aug. 22, 1988 | [JP] | Japan | 63-209149 |

[51] Int. Cl.⁵ .................. B05C 3/02; B05C 19/00; B29C 67/02
[52] U.S. Cl. .................. 118/666; 118/418; 366/105; 366/145; 366/221; 425/143; 425/222
[58] Field of Search .......... 425/222, 435, 143; 118/19, 20, 417, 418, 426, 666; 34/135; 366/220, 221, 222, 223, 224, 105, 145

[56] References Cited

U.S. PATENT DOCUMENTS

| 3,302,937 | 3/1967 | Pixley | 34/187 |
| 3,316,585 | 5/1967 | Kallberg | 425/222 |
| 3,337,965 | 8/1967 | Whitsel | 34/135 |
| 3,834,347 | 9/1974 | Motoyama et al. | 118/19 |
| 3,911,860 | 10/1975 | Nohynek et al. | 118/19 |
| 4,168,674 | 9/1979 | Futter | 118/19 |
| 4,640,218 | 2/1987 | Motoyama et al. | 118/19 |
| 4,766,839 | 8/1988 | Dunajtschik | 118/19 |
| 4,785,759 | 11/1988 | Motoyama et al. | 118/19 |
| 4,934,917 | 6/1990 | Ashton et al. | 425/222 |

Primary Examiner—Willard E. Hoag
Attorney, Agent, or Firm—Kane, Daksimer, Sullivan, Kurucz, Levy, Eisele and Richard

[57] ABSTRACT

A granulating and coating apparatus in which a rotary drum containing powdery or granular material is rotated about the substantially horizontal axis for granulating and/or coating the powdery or granular material. The apparatus is provided with a disk valve mechanism for switching a gas supply or exhaust path to the rotary drum on the operating side of the rotary drum. The rotary drum is provided inside of itself with a baffle means for stirring powdery or granular material and a baffle displacing means for displacing the baffle means. Inside of the rotary drum is provided a temperature sensor for directly measuring a temperature of powdery or granular material. The rotary drum is composed of porous polygonal. Each side of the polygonal drum includes an outer enclosure mounted thereon and individual detachable.

12 Claims, 6 Drawing Sheets

GRANULATING AND COATING APPARATUS

BACKGROUND OF THE INVENTION

1. Field of the Invention

The present invention relates to a granulating and coating technique, and more particularly to a technique in which a rotary drum containing powdery or granular material therein is rotated on its substantially horizontal axis for granulating and/or coating the material.

2. Related Art Statement

In general, such a granulating and coating apparatus is operated as follows; powdery or granular material is entered into a rotary drum called a coating pan, the rotary drum is rotated, and, if necessary, coating solution etc. is sprayed into the rotary drum, or hot air or a cooling gas, for example, is supplied into and exhausted from the drum while the drum is rotated.

However, some technical difficulty arises in supplying or exhausting a gas into or from the rotary drum because the drum moves rotatively.

For overcoming the difficulties, in prior arts, the apparatus has been designed to comprise a disk valve mechanism provided on a boundary between a rotary section and a non-rotary section of a rotary drum, said disk valve having a rotary disk and a non-rotary disk, vent holes being formed on both the rotary disk and the non-rotary disk, said vent holes selectively communicating with each other at given positions so as to switch a gas supply or exhaust path. As an example, the Japanese Patent Publication No. 50-38713 discloses such a construction.

The conventional granulating and coating apparatus, however, provides the disk valve mechanism on a rear surface of the rotary drum, that is, an opposite side to an operating side. It brings about some difficulty when an operator checks for, removes, washes, or makes sure of if the disk valve mechanism is washed up.

Further, the disk valve mechanism is fixed in the axial direction of the rotary drum, therefore, the conventional apparatus has an additional disadvantage in that it is inconvenient or difficult to find out dirt on the disk valve mechanism, wash and makes sure of if the mechanism is washed out, or check for the mechanism.

The other technical object in a granulating and coating apparatus is to perform efficient stirring and mixing of powdery or granular material contained in the rotary drum for achieving efficient and uniform granulation and/or coating.

To attain this object, a proposal has been offered that the rotary drum is provided with a fixed baffle member served as an obstacle therein (Japanese Patent Publication No. 52-10665).

However, the fixed baffle member can be used only in a small apparatus because powdery or granular material slips. Further, this baffle member merely has a limited effect.

Furthermore, since the fixed baffle member is fixed on its mount position, it can not adjust to variation of the amount of the material contained in the drum.

And, as the fixed baffle member is always mounted, its presence brings about a shortcoming when the baffle member is not desired or it should not be used, or when the baffle member is to be washed out.

Moreover, the fixed baffle member may become contaminated as a result of intrusion of powdery or granular material between the inner surface of the drum and the baffle member itself, or it is hard to remove powdery or granular material between the drum and the baffle means. In particular, in case of medicines or foods, it causes a problem relating to GMP or defects of products.

Still further, in this type of granulating and coating apparatus, it is required to optimaly control conditions for processing material to be granulated and/or coated in the rotary drum to obtain an excellent product. These conditions include spraying quantity of coating solution, an amount of hot air or a cooling gas supplied to and exhausted from the drum, and temperatures of the air or the gas supplied and exhausted. Hence, it is necessary to select a parameter or parameters for the optimal control.

The conventional apparatus normally employs the methods of measuring the exhaust air temperature from the rotary drum and controlling the amount of sprayed solution based on the measured result, because it is easy to measure the temperature of the exhaust air.

Yet, though the exhaust air temperature of the rotary drum relatively corresponds to the processing temperature within the rotary drum, the former means the temperature of the gas exhausted out of the rotary drum system, and strictly, it does not directly represent an exact temperature of material to be processed or a product contained in the rotary drum. The inventors of the present invention found out that the optimal control of the foregoing conditions can not be sufficiently achieved on the basis of the exhausted air temperature.

Another conventional granulating and coating apparatus has proposed that a porous rotary drum is provided so as to supply or exhaust a gas into or out of the rotary drum through a lot of holes formed on the drum itself.

The porous drum, however, is easy to become contaminated since powder from the powdery or granular material adheres to the insides of the holes or the outer peripheral side of the drum. The contamination from these adhered powder may bring about a quite serious problem in case of granulating and coating medicines, foods, or chemicals. It is therefore necessary to certainly prevent the contamination.

On the other hand, this type of apparatus is required to keep as wide a porous area of the porous drum as possible to increase the amount of air passed through.

In order to meet with these requirements, Japanese Patent Laid-Open No. 60-71032 discloses a rotary drum including a porous polygon drum body and removable sieve elements, said drum body at least being provided with individual opening areas closely formed on the peripheral surface thereof and enclosed by a frame, and on each of said opening areas, the sieve element being mounted removably.

The foregoing drum structure, however, has some difficulty in fitting each sieve element to the frame at each opening area because of, for example, a production error. And, the fitting operation is quite troublesome.

Further, since the sieve element and the frame require the quite strict production conditions, the production becomes severe and is subject to high cost.

In addition, it is difficult to say that the drum structure makes it possible to easily check for dirt on the outer peripheral side of the sieve element or wash them out.

SUMMARY OF THE INVENTION

It is, therefore, an object of the present invention to provide a granulating and coating apparatus which is capable of achieving easy operation, maintenance, or washing.

It is another object of the invention to provide a granulating and coating apparatus which is capable of variably adjusting the mount position of a baffle means which is mounted independent from the rotation of the rotary drum.

It is a further object of the invention to provide a granulating and coating apparatus which is capable of simply and surely displacing the baffle means.

It is a still further object of the invention to provide a technique which enables precise control of a granulating and coating apparatus with parameters directly representing a processing temperature within a rotary drum.

It is another object of the invention to provide a granulating and coating apparatus which is capable of easily and certainly checking for dirt on the outer peripheral surface of the rotary drum, washing them out, and making sure of if they are washed out.

Of the aspects of the invention disclosed herein, the representative ones will be summarized as follows.

According to one aspect of the present invention, the granulating and coating apparatus is designed to provide on the operating side of the rotary drum a disk valve mechanism which serves to switch a gas supply or exhaust path to the rotary drum containing powdery or granular material.

And, the disk valve mechanism comprises a rotary disk to be rotated with the rotary drum and a non-rotary disk to be allowed to come into sliding contact with the rotary disk and to be pulled out of the operating side of the rotary drum.

The foregoing granulating and coating apparatus makes it possible for an operator to easily check for dirt on the disk valve mechanism, wash them out, and make sure of if they are washed out because the disk valve mechanism is provided on the operating side.

And, the granulating and coating apparatus makes it possible to more easily check for dirt on the disk valve mechanism or wash them out as well as to check for the interior of the rotary drum and wash it out without interruption by the disk valve mechanism, since the non-rotary disk can be pulled out of the operating side.

According to another aspect of the invention, the granulating and coating apparatus further comprises a baffle displacing means to displace the baffle means between the inside of the layer of powdery and granular material and the outside thereof, the baffle means being for stirring powdery or granular material contained in the rotary drum.

The baffle displacing means comprises a rotation shaft, a first actuator for rotating the rotation shaft, a supporting arm mounted to the rotation shaft with a given angle therebetween, and a mount bar directly or indirectly connected to the supporting arm with a given angle therebetween, the baffle means being mounted to this mount bar independent from the rotation of the rotary drum.

The mount bar may be connected to the supporting arm through a second actuator for rotating the baffle means through the mount bar.

The mount bar may be enabled to be displaced in the axial direction thereof through the effect of the second actuator.

The rotary drum may employ a polygon design.

The granulating and coating apparatus as set forth above is capable of variably adjusting the mounting level of the baffle means within the layer of powdery or granular material according to the processing conditions such as amount of powdery or granular material or a processing stage, and capable of displacing it outside the layer when it is unnecessary or washed out, because the position of the baffle means provided in the rotary drum is allowed to be displaced between the inside of the layer of powdery or granular material and the outside thereof.

With the above-described structure, the baffle means, which is mounted independent from rotation of the rotary drum, can be displaced with the baffle displacing means of simple design.

And, since the second actuator enables rotation of the baffle means and the displacement of the mount bar and the baffle means, it serves to variably adjust the stirring effect and position of the baffle means.

Since the rotary drum employs polygon, it is possible to reliably perform the granulating and coating operation without any slip of powdery or granular material.

According to another aspect of the invention, the granulating and coating apparatus provides in the rotary drum a temperature sensor for directly measuring a temperature of powdery or granular material contained in the rotary drum.

The temperature sensor may be directly inserted into the powdery or granular material contained in the rotary drum.

Otherwise, the temperature sensor may be provided in the rotary drum and directly measure the temperature of powdery or granular material without contacting the powdery or granular material contained in the rotary drum.

According to another aspect of the invention, the granulation and coating apparatus comprises, in addition to the temperature sensor, a baffle means for stirring powdery or granular material contained in the rotary drum and a baffle displacing means for displacing the baffle means between the inside of the layer of powdery and granular material and the outside of the layer.

The temperature sensor can be mounted to the baffle means or the baffle displacing means.

As the granulating and coating apparatus described can employ the temperature sensor for directly measuring the temperature of powdery or granular material contained in the rotary drum, it can perform the control based on a more precise parameters rather than the exhaust temperature of the rotary drum.

The temperature sensor may be directly inserted into the powdery or granular material contained in the rotary drum. Hence, it can precisely measure the temperature because of direct contact with the powdery or granular material and can be reduced in size.

Otherwise, the temperature sensor may be one of a non-contact type which is capable of precisely measuring the temperature of powdery or granular material without contacting it.

According to another aspect of the invention, the granulating and coating apparatus may employ a porous drum as a rotary drum containing powdery or granular material and be provided with a plurality of outer enclosures to be respectively mounted on or dismounted from the outside of the holes.

The rotary drum may be polygonal so that the outer enclosures can be respectively mounted on or dismounted from each side of the polygon.

According to this aspect of the invention, the granulating and coating apparatus makes it possible to easily check for dirt on the outer peripheral surface of the rotary drum and wash them out and make sure of if they are washed out by simply removing the frames.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENT

At first, the granulating and coating apparatus according to the invention will be described with referred to FIGS. 1 to 6. A rotary drum 1 contains powdery or granular material such as powder or tablets to be processed therein. The rotary drum 1 is supported on rotary rollers 4 in a manner to be rotated on its horizontal axis through a belt 3 by a driving source 2 such as a motor.

According to one embodiment of the invention, the rotary drum 1 employs octagonal design as an example of polygonal design. The octagonal design serves to suppress slipping of powdery or granular material contained in the rotary drum 1. The octagonal rotary drum 1 has a lot of holes 5 at given positions on each side of the octagon. These holes 5 are formed by a punching method, for example. The rotary drum 1 with holes 5 can be made, for example, by forming holes 5 on each plate with a given size and connecting these plates with welding so as to form an octagon, or by welding eight plates with holes 5 on the frame.

The octagonal rotary drum 1 with a lot of holes 5 provides sealing jackets, that is, detachable outer enclosures 6 to be located on each side of the octagon so that the outer peripheral surface of the rotary drum can be easily and certainly wash out.

Each of the enclosures 6 has a size corresponding to each side of the octagonal rotary drum 1. And, for example, by fitting a flange 8 welded on the inside of the enclosure 6 into a flange 7 welded on the outer surface of each drum side while an operator holds hand sections 9, each enclosure 6 can be sealingly mounted on or removed from each side of the rotary drum 1. A gas communicating space 10 is defined by the outer surfaces of the sides of the rotary drum 1, the insides of the enclosures 6, and the flanges 7, 8.

And, ducts 11, 12 are provided to supply or exhaust a gas such as hot air or cooling gas into or from the inside of the rotary drum 1 through them. By using the ducts 11, 12 as shown by a broken line, reversely by a solid line, gas supply and exhaust to the inside of the rotary drum 1 can be reversed.

In order to switch gas supply or exhaust path which leads from the duct 11 or 12 through the inside of the rotary drum 1 to the duct 11 or 12, a disk valve mechanism 13 is provided on one side of the rotary drum 1, that is, the operating side (front side, or left-hand side in FIG. 3) from which an operator can have access to the apparatus.

The disk valve mechanism 13 comprises a rotary disk 14 provided on the operating side (front side) of the rotary drum 1 and to be rotated with the rotary drum 1, and a non-rotary disk 15 which comes into contact with an outside, that is, an operating side (left-hand side in FIG. 3) of the rotary disk 14.

The rotary disk 14 provides a plurality of longitudinal openings 16 each communicating with the gas communicating space 10. The non-rotary disk 15 also provides an arc concave 17 to be selectively communicated with any one of a plurality of the openings 16.

As appreciated above, the openings 16 of the rotary disk 14 and the concave 17 of the non-rotary disk 15 are selectively communicated with each other according to the rotational position of the rotary drum 1. In particular, one or more openings 16 at the position of the layer M of powdery and granular (FIG. 1) in the rotary drum 1 are selectively communicated with the concave 17. Hence, the gas supply into or exhaust from the rotary drum 1 is selectively switched through the communicating path.

The disk valve mechanism 13 according to the embodiment is provided on the front side, that is, the operating side of the rotary drum 1, therefore its operation such as a washing operation is easily performed. Furthermore, as will be appreciated from FIG. 3, the disk valve mechanism 13 is constructed such that the non-rotary disk 15 can be pulled from a position indicated by solid line in FIG. 3 to a position indicated by two-dotted chain line while being supported by three sliding shafts 18 (two shafts are shown).

Figure 3:
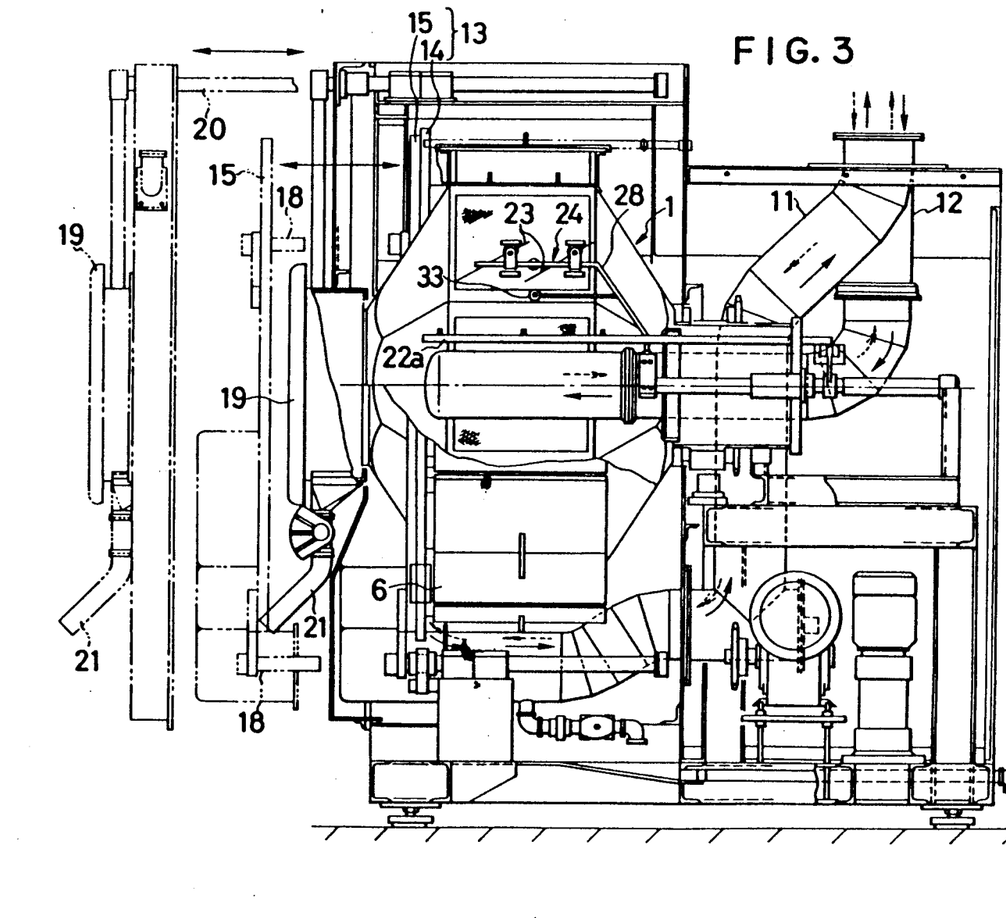
FIG. 3 is a partially broken side view showing the overall granulating and coating apparatus according to the embodiment.

And, in order to enable the non-rotary disk 15 to be pulled toward the operating side, a product outlet 19 of the rotary drum 1 located closer to the operating side than the non-rotary disk 15 is enabled to be pulled toward the operation side as shown by a two-dot chain line in FIG. 3 from the assembled state (shown by a solid line) by means of sliding shafts 20. Numeral 21 denotes a product exhaust pipe for picking up products from the rotary drum 1.

As set forth above, the disk valve mechanism 1 according to the embodiment makes it possible to allow an operator to easily enter into the space between the pulled-out outlet 19 and the non-rotary disk 15 and wash out the disk valve mechanism 13 or check for it by pulling the outlet 19 and then pulling the non-rotary disk 15 toward the operating side.

Figure 4:
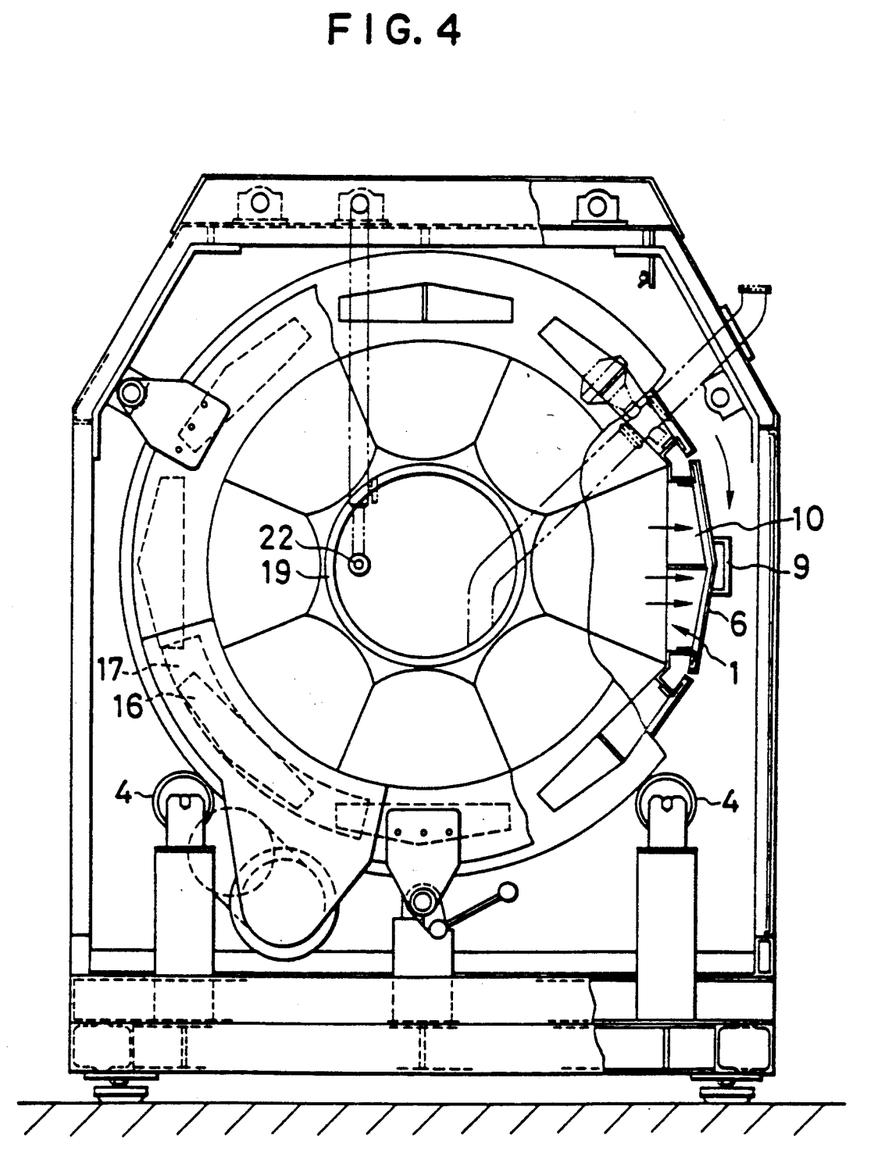
FIG. 4 is an elevation of the embodiment as viewed from the front operating side.
Figure 5:
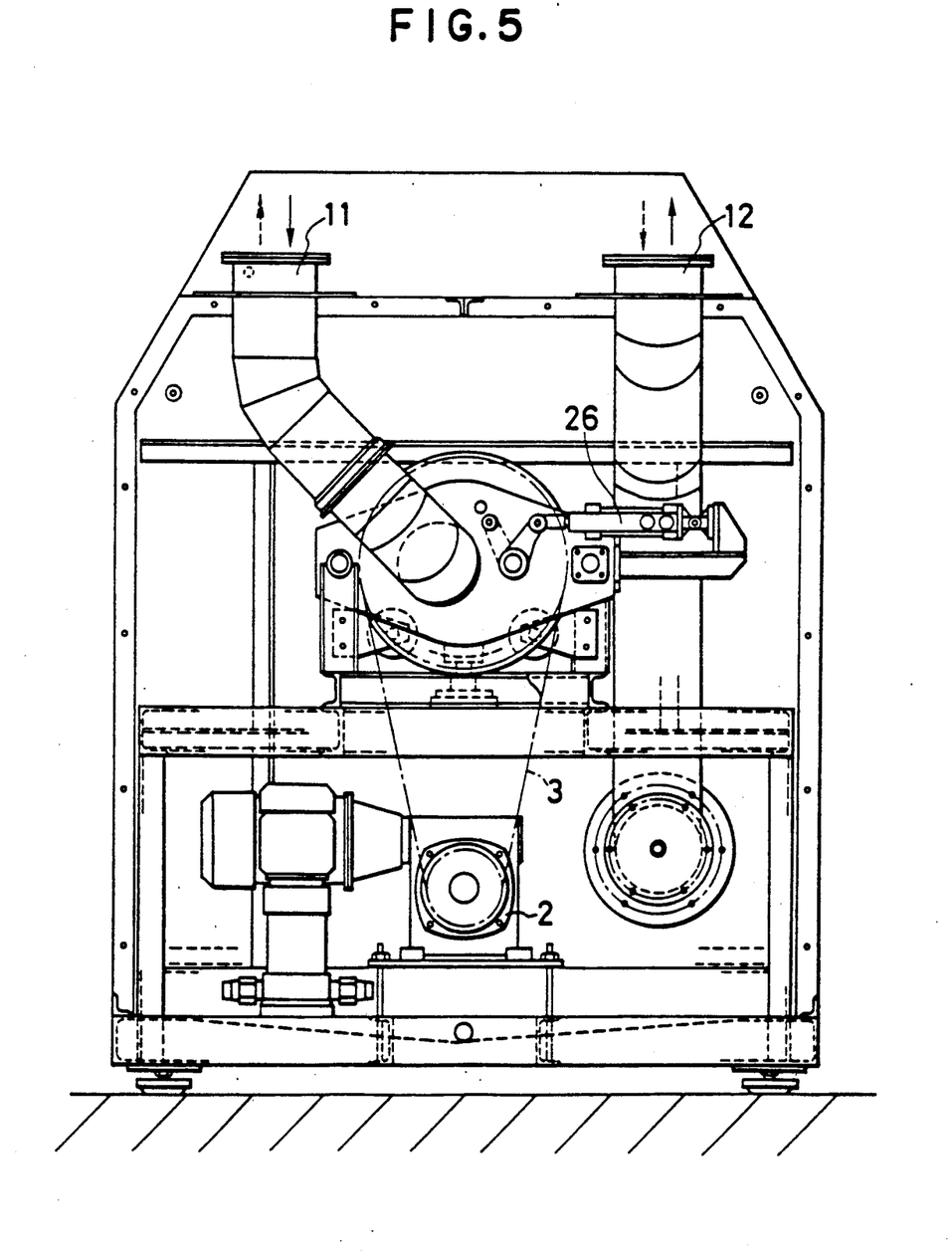
FIG. 5 is a back elevation of the embodiment.

Further, as shown in FIG. 4, according to the embodiment, a nozzle unit 22 is inserted in axial direction from the front side (left-hand side in FIG. 3) of the rotary drum 1 into the inside of the rotary drum 1 for supplying coating solution or binder liquid.

And, in FIG. 3, numeral 22a denotes a nozzle unit for supplying a cleaning liquid into the rotary drum 1.

Inside the rotary drum, a baffle means for stirring powdery or granular material contained in the rotary drum 1 is mounted independent from rotation of the rotary drum 1. The baffle means comprises a baffle plates 23 which can be displaced by a baffle displacing means 24 (see FIG. 2) in the range from the inside of the layer M of powdery and granular material to the outside thereof in the rotary drum 1 as shown in solid line and two-dotted chain line in FIG. 1.

Figure 1:
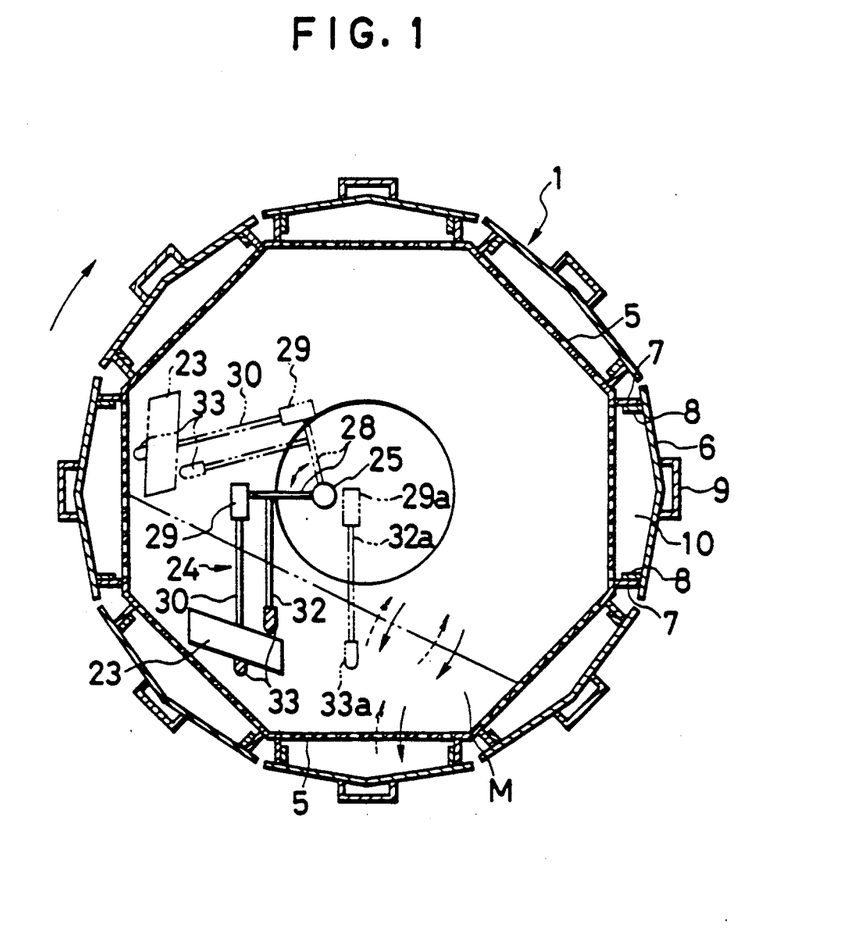
FIG. 1 is a sectional view showing a granulating and coating apparatus according to a preferred embodiment of the present invention.
Figure 2:
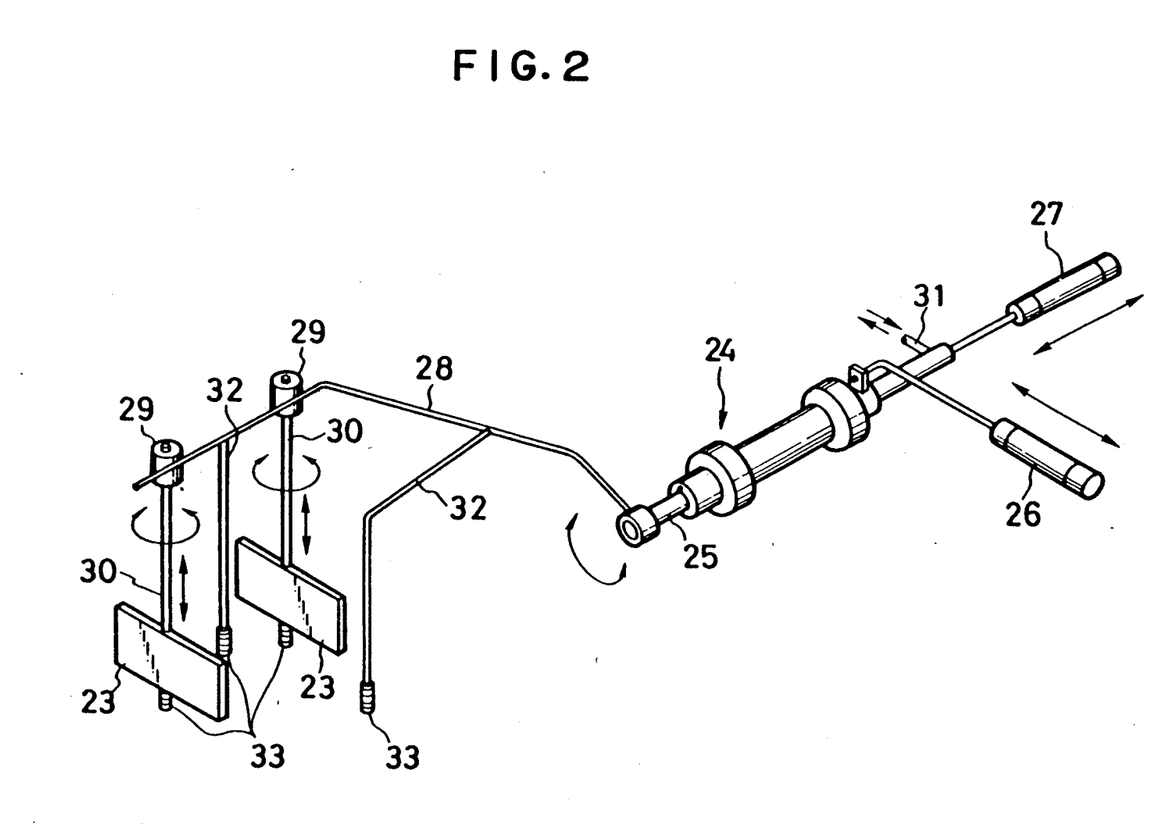
FIG. 2 is a perspective view showing baffle means, a baffle displacing means, and temperature sensors included in the granulating and coating apparatus of the embodiment.

Then, a description will be directed to the baffle displacing means 24 for displacing the baffle means 23. As shown in FIG. 2, the baffle displacing means 24 comprises a rotation shaft 25, an air cylinder 26 (first actuator) for rotating or rocking the rotation shaft 25 in the range of, for example, about 120 degrees, an air cylinder 27 for moving the rotation shaft 25 in the axial direction, a substantially L-shaped supporting arm 28 integrally mounted on the end of the rotation shaft 25 with a given angle therebetween, an actuator 29 (second actuator) such as a rectilinear-oscillating type air cylinder mounted at the tip of the supporting arm 28, and mount bars 30 to be straightly and rockingly moved by the actuator 29.

The baffle plate 23 is mounted at the tip of the mount bar 30 with a given angle therebetween.

When the rotation shaft 25 is rotated at a given angle by straightly moving the piston rod of the air cylinder 26 to and fro, the baffle plates 23 are displaced by any variation between a solid line position and a two-dot chain line position in FIG. 3 together with the supporting arm 28 and the mount bars 30.

For supplying or exhausting the operating air (compressed air) to or from the actuator 29, a fluid passage (not shown) is formed axially in the inside of the rotation shaft 25 and the supporting arm 28. And, the operating air is supplied from an air pipe 31 connected to the rotation shaft 25 to the actuator 29 through the fluid passage or exhausted vice versa to operate the actuators 29 which serve to rotate or axially displace the mount bars 30 and the baffle plates 23.

In order to displace the baffle plates 23, the mount bars 30 may be directly mounted onto the supporting arm 28 not through the actuator 29, thus the baffle plates 23 being displaced with displacement of the supporting arm 28.

In this embodiment, in order to directly measure the temperature of powdery or granular material contained in the rotary drum 1, two temperature sensors 33 are mounted onto the supporting arm 28 of the baffle displacing means 24. The temperature sensors 33 are supported on sensor mounting arms 32 respectively. Further, in order to surely and precisely measure the temperature of powdery or granular material, temperature sensor 33 is mounted also at each tip of the baffle plates 23 in this embodiment.

The temperature sensors 33 are used for measuring a temperature of powdery or granular material (products) to control the amount of liquid sprayed from the nozzle unit 22 into the rotary drum 1, the amount of supply and exhaust air from the ducts 11, 12, and the supply and exhaust air temperatures to optimal values by a control unit (not shown).

According to the embodiment, the temperature sensors 33 are inserted into the layer M of powdery or granular material. That is, when it serves to measure the temperature of powdery or granular material, it is in direct contact with the material. Hence, it is possible to measure the temperature with quite high accuracy and to easily reduce the temperature sensor 33 in size.

As the direct contact type temperature sensor 33, a thermocouple type or platinum contact type temperature sensor may be employed. If necessary, an infrared fiberscope may be directly inserted into the layer M of powdery or granular material. The number of the temperature sensors 33 is one or more, not limited.

In particular, the temperature sensor 33 according to the embodiment is supported on the supporting arm 28 included in the baffle displacing means 24, thereby displacing the sensor 33 with the displacement of the supporting arm 28. It therefore is able to sense the temperature of a desired portion in the layer M of powder or granular material, follow the change of the layer M, and move back from the layer M if necessary as shown by a two-dot chain line in FIG. 1.

The temperature sensor is, of course, not inevitably mounted onto the baffle displacing means 24. Like the temperature sensor 33a shown by a two-dot chain line in FIG. 1, for example, it may be mounted on an independent sensor mount arm 32a. In this case, it is advantageous if the temperature sensor 33a is supported to be axially displaced by a linear actuator 29a for the sensor mount arm 32a, because it can variably adjust the measuring position.

The temperature sensor may be not only a direct contact type but also a non-contact type if it can directly measure the temperature of powdery or granular material contained in the rotary drum 1.

Figure 6:
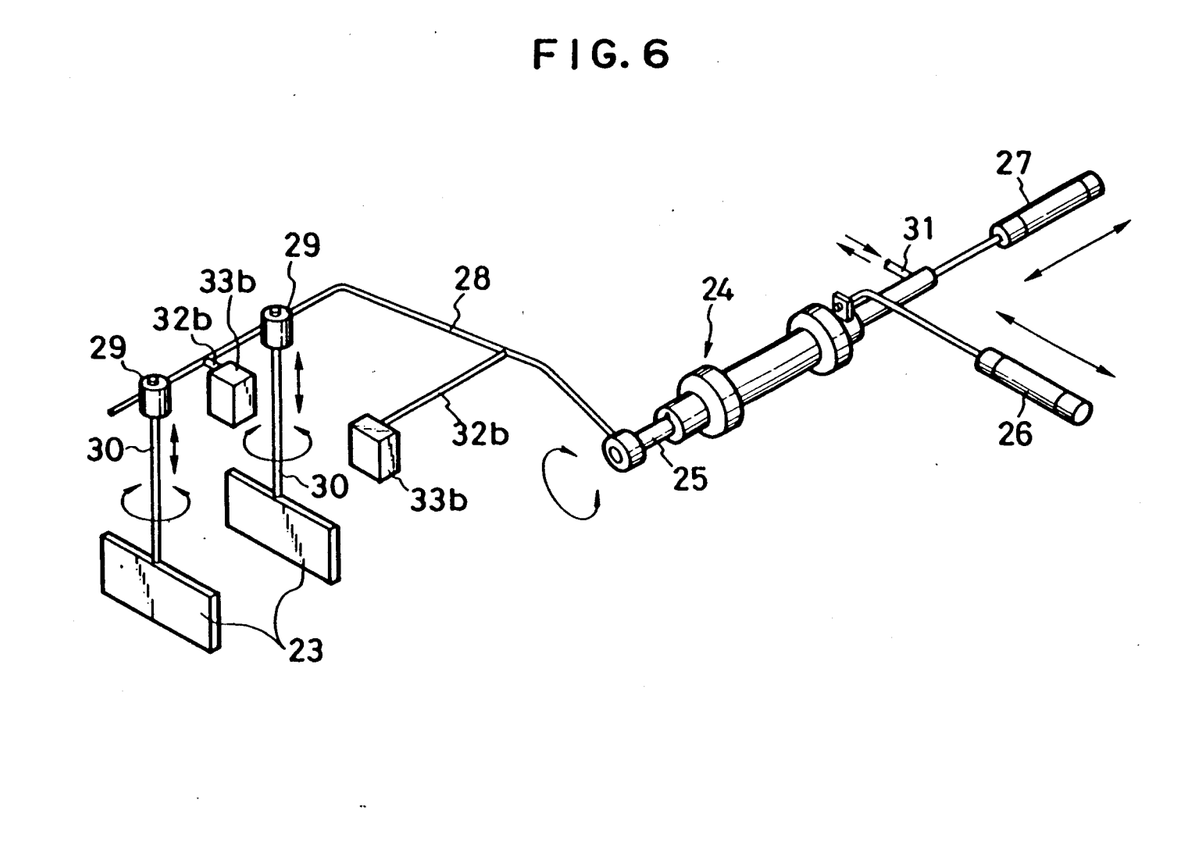
FIG. 6 is a perspective view showing a variation of baffle means and temperature sensors according to the invention.

FIG. 6 shows non-contact type temperature sensors 33b. These temperature sensors 33b are infrared ray type temperature sensors. Also, a reflection type or a transparent type infrared ray fiberscope temperature sensor may be used.

Like the temperature sensors 33 shown in FIG. 2, the temperature sensors 33b in FIG. 6 are mounted onto the supporting arm 28 of the baffle displacing means 24 through the sensor supporting arms 32b. Like the temperature sensor 33a in FIG. 1, however, it may be provided independently of the baffle displacing means 24.

Next, a description will be directed to the operation of this embodiment of the granulation and coating apparatus.

The required amount of the powdery or granular material is loaded into the rotary drum 1. Then, a given coating solution etc. is supplied into the rotary drum 1 through the nozzle unit 22 as the rotary drum 1 is rotated by the driving source 2 through a belt 3. Next, a gas such as hot air or cooling gas is supplied into or exhausted from the rotary drum 1 through the duct 11 or 12.

By repeating the above operation, the powdery or granular material is tumbled in the rotary drum 1, resulting in performing the required granulating and coating operation.

As the rotary drum 1 is provided with the baffle plates 23 which can be displaced, the present embodiment offers an optimal stirring and mixing effect to the powdery or granular material in the rotary drum 1 and the efficient and uniform granulating and coating operation is obtained.

The baffle plates 23 serving as the baffle means in the present embodiment is supported by the baffle displacing means 24. Hence, by moving the rotation shaft 25 of the baffle displacing means 24 by a given angle with the air cylinder 26, the baffle plates 23 are variably adjusted through the supporting arms 28 and the mount bars 30 so as to be located at the required position in the layer M of powdery and granular material. Further, when unnecessary, the baffle plates 23 can be located outside of the layer M (see a two-dot chain line in FIG. 1). Thus, by the baffle plates 23, optimal stirring and mixing are attained.

In this embodiment, the temperature sensors 33, 33a, 33b directly measure the temperature of powdery or granular material contained in the rotary drum 1 when they are in contact with or isolated from the powdery or granular material, thereby precisely measuring the temperature. It is therefore possible to control to optimal values the amount of sprayed liquid such as coating solution and the amounts of supply and exhaust air, and the temperatures of supply and exhaust air.

And, the granulating and coating apparatus of the embodiment is provided on the front side, that is, operating side of the rotary drum 1, with the disk valve mechanism 13 for switching the path of gas supplied into and exhausted from the rotary drum 1, and the non-rotary disk 15 to be pulled toward the operating side. It is therefore possible to easily and surely wash out or do maintenance of the disk valve mechanism 13. This construction is very effective if the apparatus serves for granulating and coating of powdery or granular material such as medicines or foods requiring high cleanness.

Further, according to the embodiment, the rotary drum 1 is polygonal and has a lot of holes 5 on the peripheral surface thereof. The detachable outer enclosures 6 are located around each sides of the rotary drum. By simply removing the enclosures 6, therefore, it is possible to easily and surely wash out the outside peripheral surface of the rotary drum 1. This is very advantageous in improving cleanness and service level.

Granulated and coated products are re-collected, for example, by reversely rotating the rotary drum 1, out of the outlet 19 of the product exhaust pipe 21 be means of a recovery mechanism (not shown).

As set forth above, the invention of the present inventors has been concretely described with reference to a preferred embodiment of the invention. However, it goes without saying that the invention is not limited to the foregoing embodiment, but may be subject to various modifications without departing from the scope of the invention.

For example, the baffle plate 23 is not limited in form and size to that of the foregoing embodiment, and the baffle displacing means 24 is not also limited to the foregoing structure.

The type, the supporting method, and the number of the temperature sensors 33, 33a, 33b are not limited also to those of the foregoing embodiment.

It is possible to employ another structure of disk valve mechanism 13, rotary disk 14, or non-rotary disk 15 or method of supporting them except those disclosed in the foregoing embodiment.

The mounting or demounting structure or method of the outer enclosure 6 and the assembling method of porous members with a lot of holes 5 are not limited also to the foregoing embodiment.

Furthermore, it is possible to employ a hydraulic or electric operating type actuators in place of the air cylinders 26, 27 and the actuators 29, 29a, or pipe arrangement can be changed at will.

In the foregoing description, the present invention has been described referring to applications in the fields of medicines, foods, and chemicals. However, without being limited to those products, the invention can be applied to granulating and coating the other powdery or granular materials and to the powdery or granular material processes such as drying or mixing process.

The representative efficiencies of the invention are described as follows.

(1) The granulating and coating apparatus comprises a rotary drum containing powdery or granular material and a disk valve mechanism for switching a gas supply or exhaust path to the rotary drum. As the disk valve mechanism is provided on the operating side of the rotary drum, an operator can easily check for dirt on the disk valve mechanism, wash them out and make sure of if they are washed out, resulting in improved operability, maintenance, and cleanness.

(2) The disk valve mechanism provides a rotary disk to be rotated with the rotary drum and a non-rotary disk to be in contact with the rotary disk and to be pulled toward the operating side of the rotary drum. Hence, it is easier to check for dirt on the disk valve mechanism, wash them out and make sure of if they are washed out. And, checking for and washing the inside of the rotary drum can be easily carried out without being interrupted by the disk valve mechanism. It results in greatly improving operability, maintenance, and cleanness of the apparatus as a whole.

(3) The granulating and coating apparatus comprises a rotary drum containing powdery or granular material, a baffle means for stirring powdery or granular material contained in the rotary drum, and a baffle displacing means for displacing the baffle means between the inside of the layer of powdery or granular material and the outside thereof. It is therefore able to variably adjusting the mount position of the baffle means according to the processing conditions such as the amount of powdery or granular material, thereby offering an optimal stirring and mixing effect. Further, it is also used as the baffle means for a large granulation and coating apparatus.

(4) As will be appreciated from the item (3), the baffle means can be moved from the layer of powdery or granular material where it is not used or being washed, resulting in suppressing its disturbance of operation and cleaning.

(5) The baffle displacing means comprises a rotation shaft, a first actuator for rotating the rotation shaft, a supporting arm mounted onto the rotation shaft with a given angle therebetween, and a mount bar directly or indirectly connected to the supporting arm with a given angle therebetween and the baffle means mounted thereto. Hence, it is possible to surely displace the baffle means with simple construction.

(6) The mount bar is connected to the supporting arm through a second actuator for rotating the mount bar and the baffle means, resulting in allowing the second actuator to rotate and displace the mount bar and the baffle means. Hence, it is possible to variably adjust a stirring and mixing effect and a stirring position of the baffle means.

(7) As the first and second actuators included in the baffle displacing means respectively employ air cylinders, it is possible to obtain the granulating and coating apparatus with a reliable anti-explosion characteristic and at low cost.

(8) Since the rotary drum is polygonal, it is also possible to suppress slipping of powdery or granular material and perform the efficient granulating and coating operation.

(9) The granulating and coating apparatus is provided with a rotary drum containing powdery or granular material and a temperature sensor for directly measuring the temperature of powdery or granular material contained in the rotary drum, said sensor being provided in the rotary drum. It therefore allows the temperature of the powdery or granular material contained in the rotary drum to be precisely and directly measured. The measurement makes it possible to precisely and reliably control conditions such as the amount of sprayed liquid, the amounts of supply and exhaust air, and the temperatures of supply and exhaust air based on parameter derived from the measured result.

(10) Since the temperature sensor is directly inserted into the powdery or granular material contained in the rotary drum, the direct contact between the temperature sensor and the powdery or granular material makes it possible to precisely measure the temperature of the powdery or granular material.

And, the temperature sensor can be easily reduced in size.

(11) The temperature sensor is provided in the rotary drum and is able to directly measure the temperature of powdery or granular material contained in the rotary drum in non-contact with the powdery or granular material. Hence, it is possible to precisely and directly measure the temperature of powdery or granular material contained in the rotary drum.

(12) The granulation and coating apparatus is provided with a baffle means for stirring powdery or granular material contained in the rotary drum and a baffle displacing means for displacing the baffle means between the inside of the layer of powdery or granular material and the outside thereof in the rotary drum. Hence, the position of the baffle means can be variably kept to an optimal value corresponding to a thickness of the layer. When it is not used or washed out, the baffle means can be moved back from the layer.

(13) The temperature sensor is mounted to the baffle means or the baffle displacing means. Hence, the temperature sensor can be displaced together with the baffle means and the baffle displacing means, resulting in locating the temperature sensor at a more suitable measuring position.

(14) In the granulating and coating apparatus including a rotary drum containing powdery or granular material, the rotary drum comprises porous member, and a plurality of outer enclosures are located outside of the porous member in individually detachable manner. By simply removing the enclosures from the rotary drum, therefore, it is possible to easily and positively check for dirt on the enclosures, wash them out, and make sure of if they are washed out.

(15) The granulating and coating apparatus set forth in the item (14) can be applied to the granulating and coating operation for products such as medicines or foods requiring quite high cleanness.

(16) The granulating and coating apparatus set forth in the item (14) does not require the hard and troublesome production technique to fit porous member into the frames precisely, resulting in facilitating manufacture of a porous rotary drum.

(17) The rotary drum is polygonal and the detachable outer enclosure is mounted to each side of the polygonal rotary drum. This polygonal drum, therefore, makes it possible to carry out the granulating and coating operation without slipping of powdery or granular material.

What is claimed is:

1. In a granulating and coating apparatus comprising a rotary drum to contain a powdery or granular material and a disk valve mechanism for switching a gas supply or exhaust path to said rotary drum the improvement wherein said disk valve mechanism is located on an operating side of said rotary drum from which an operator can gain access to the interior of said drum.

2. The granulating and coating apparatus as set forth in claim 1, wherein said disk valve mechanism comprises a rotary disk which rotates with said rotary drum and a non-rotary disk, said non-rotary disk being movable in a direction toward the operating side of the rotary drum from a position wherein said non-rotary disk is in sliding contact with said rotary disk.

3. The granulating and coating apparatus as set forth in claim 1, which further comprises a baffle means, which is mounted independent from rotation of the rotary drum, for stirring the powdery or granular material contained in said rotary drum and a baffle displacing means for displacing the baffle means between the inside of a layer of powdery or granular material and the outside thereof in said rotary drum.

4. The granulating and coating apparatus as set forth in claim 3 further comprising a temperature sensor mounted to one of said baffle means and said baffle displacing means.

5. The granulating and coating apparatus as set forth in claim 3, wherein said baffle displacing means comprises a rotation shaft, a first actuator for rotating said rotation shaft, a supporting arm mounted onto said rotation shaft with a predetermined angle therebetween, and a mount bar directly or indirectly connected to said supporting arm with a predetermined angle therebetween, said baffle means being mounted on the mount bar.

6. The granulating and coating apparatus as set forth in claim 5, wherein said mount bar is connected to said supporting arm through a second actuator for rotating baffle means through said mount bar.

7. The granulating and coating apparatus as set forth in claim 6, wherein said mount bar can be axially displaced by said second actuator.

8. The granulating and coating apparatus as set forth in claim 1, wherein a temperature sensor is provided inside said rotary drum for directly measuring a temperature of powdery or granular material contained in said rotary drum.

9. The granulating and coating apparatus as set forth in claim 8, wherein said temperature sensor is mounted such as to be directly inserted in the powdery or granular material contained in the rotary drum.

10. The granulating and coating apparatus as set forth in claim 8, wherein said temperature sensor is provided inside of said rotary drum for directly measuring the temperature of said powdery or granular material contained in said rotary drum in non-contact with said powdery or granular material.

11. The granulating and coating apparatus as set forth in claim 1, wherein said rotary drum comprises a porous member and a plurality of outer enclosures are located outside of said porous member in individually detachable sections.

12. The granulating and coating apparatus as set forth in claim 11, wherein said rotary drum is polygonal and said outer enclosures are mounted on respective sides of said polygonal drum.

* * * * *